United States Patent [19]

Vance

[11] 4,209,931
[45] Jul. 1, 1980

[54] EYELESS FISHING ROD EMPLOYING NOVEL HAND AND REEL GRIPPING MEANS

[76] Inventor: John E. Vance, 11030 N. 85th Pl., Scottsdale, Ariz. 85260

[21] Appl. No.: 9,113

[22] Filed: Feb. 2, 1979

[51] Int. Cl.² ............................................. A01K 87/06
[52] U.S. Cl. .................................... 43/22; 43/23; 43/24
[58] Field of Search ................. 43/18 R, 23, 24, 22

[56] References Cited

U.S. PATENT DOCUMENTS

| | | | |
|---|---|---|---|
| 1,595,275 | 8/1926 | White | 43/24 |
| 2,777,239 | 1/1957 | Cushman | 43/24 |
| 3,068,603 | 12/1962 | Zeigler | 43/22 |
| 3,213,563 | 10/1965 | Zeigler | 43/22 |
| 4,020,581 | 4/1978 | Genovese | 43/22 |

*Primary Examiner*—Nicholas P. Godici
*Attorney, Agent, or Firm*—Warren F. B. Lindsley

[57] ABSTRACT

An elongated hollow tubular internally coated casting rod through which a fishing line is passed employing a novel handle for storing a magnetic line threading means and which handle cooperates to quickly attach and detach a reel mechanism to and from the rod and positions the hand of the user for optimum reel control with minimum fatigue.

15 Claims, 9 Drawing Figures

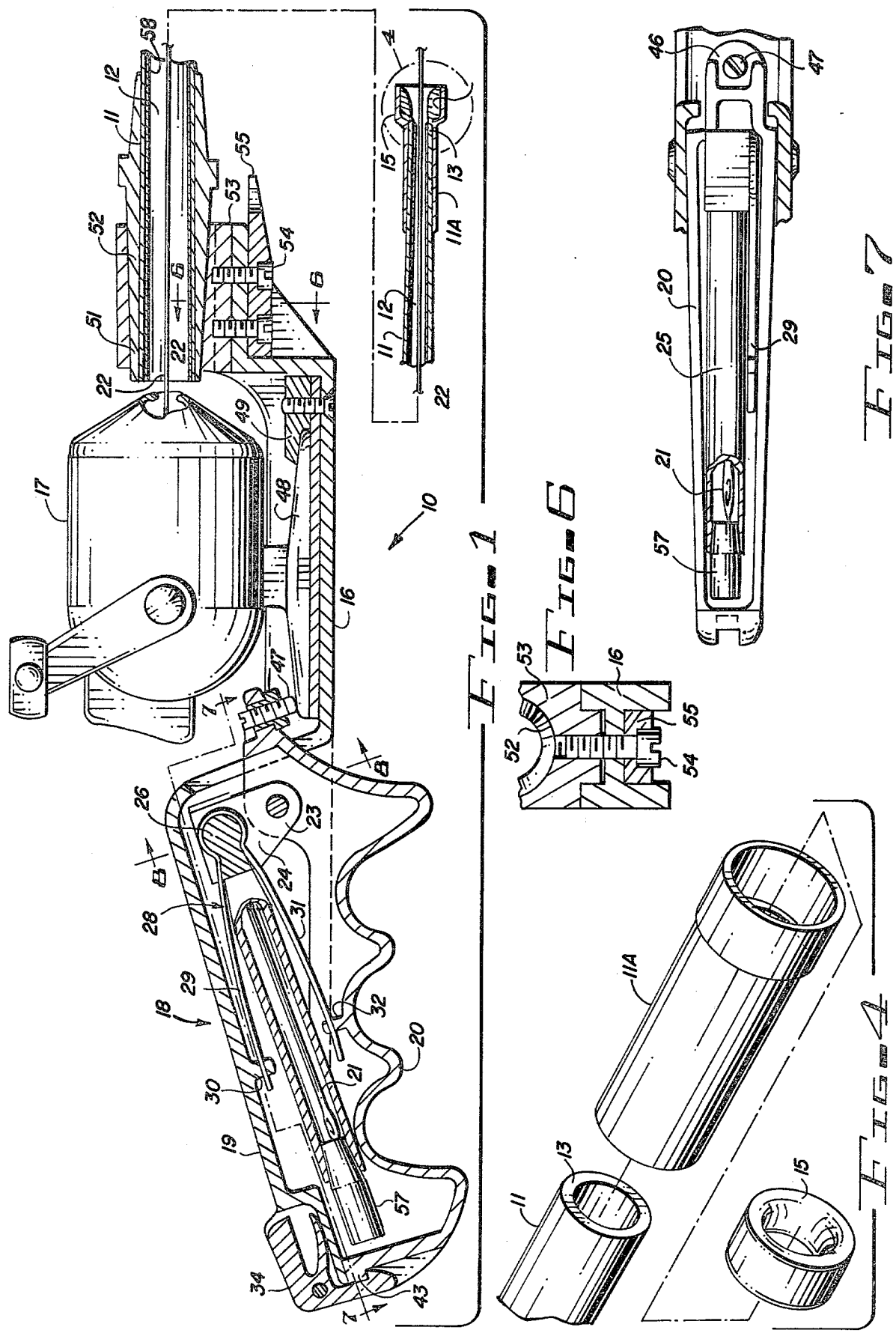

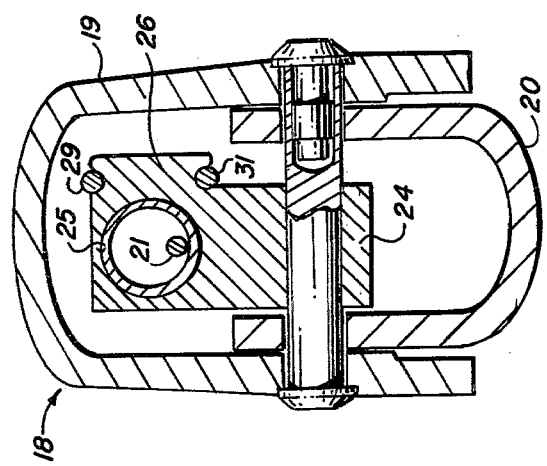
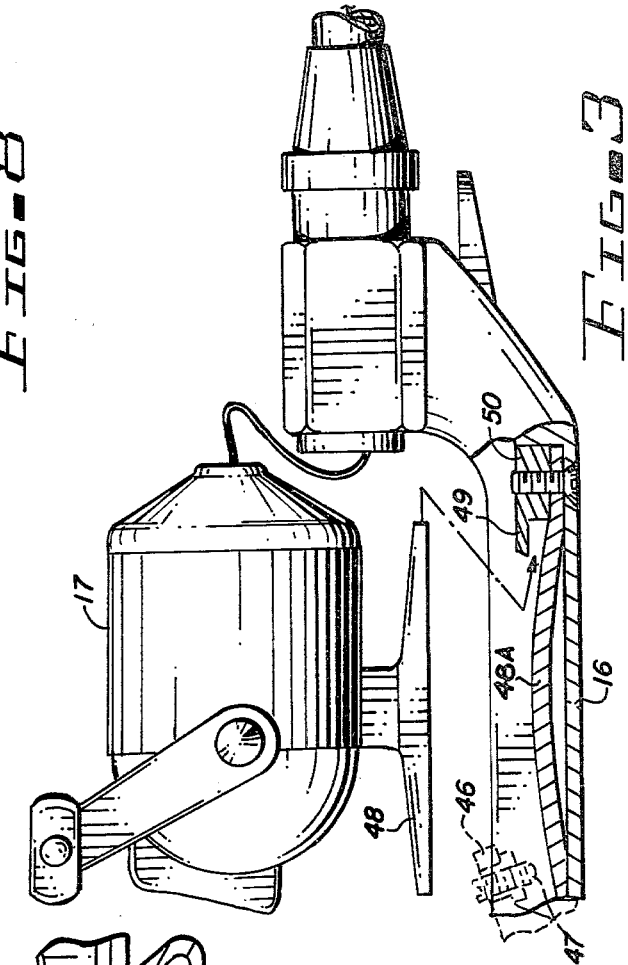
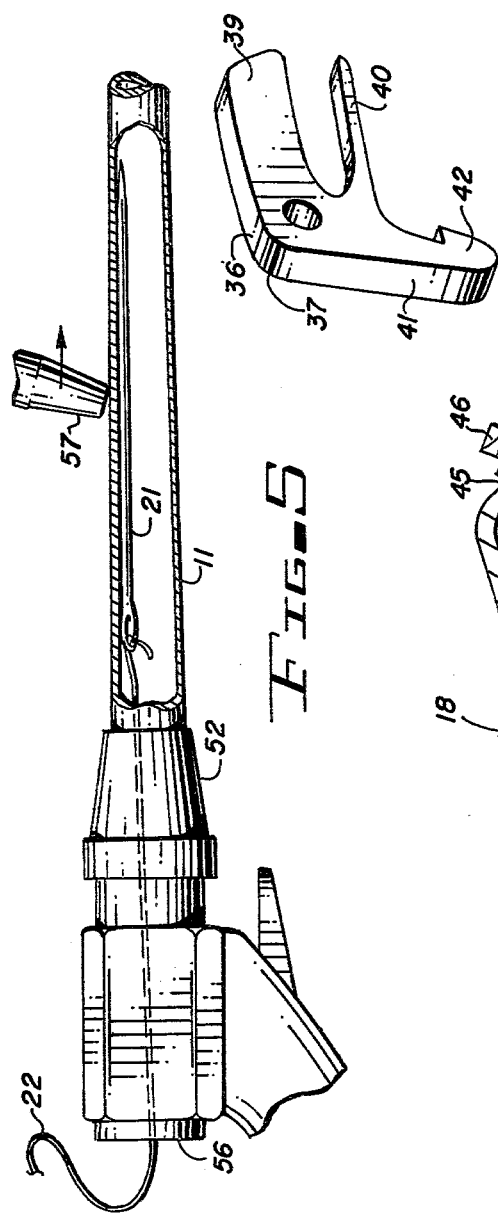
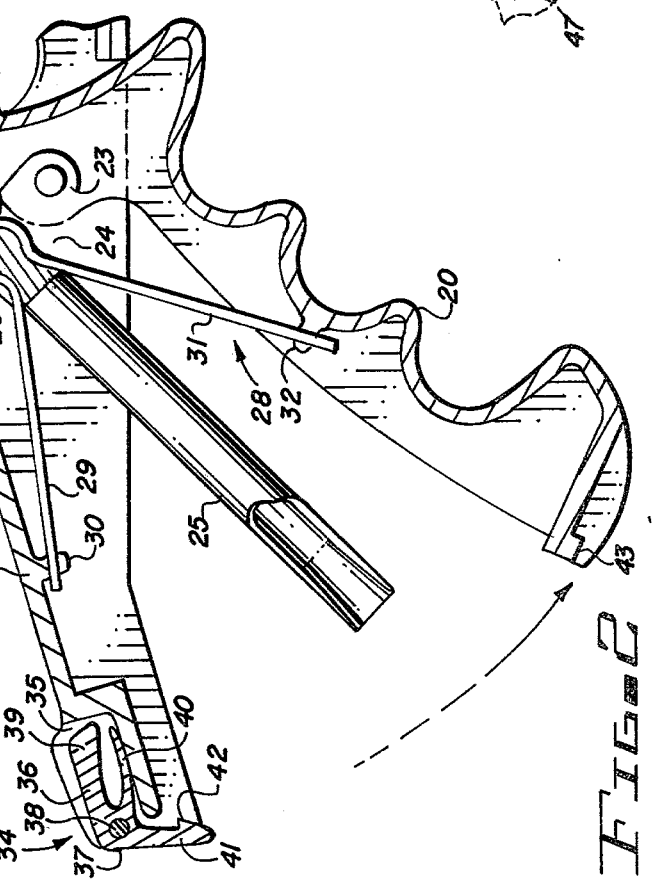

EYELESS FISHING ROD EMPLOYING NOVEL HAND AND REEL GRIPPING MEANS

BACKGROUND OF THE INVENTION

This invention relates to eyeless fishing rods and reel mounting mechanism therefor which provide for controlled passage of a reel broadcasted fishing line through the center of the rod while reducing line contact and frictional engagement with the bore of the rod at its tip to reduce drag on the line. The handle of the rod stores a magnetic line threading means and cooperates with the rod to quickly attach and detach a reel therefrom while securely holding it in place during use.

DESCRIPTION OF THE PRIOR ART

Although many casting rod design configurations have been known and some of which have been patented, none have been so carefully designed as to optimize reel mounting and use, line threading through the hollow bore of the eyeless rod, ease of manipulation with reduced fatigue of the user compared to prior art rods and line control while still maintaining ease in production and manufacture so as to keep the cost in a range to be afforded by most of the fishing populace.

U.S. Pat. No. 4,020,581 discloses an eyeless fishing rod employing reel mounting means utilizing an over-center cam locking mechanism which urges a rigid resilient covered plate into tight clamping engagement with a reel mounting plate. The disclosed structure does not compensate for wear of its cam surfaces 31 and deterioration with age of its cushion 28. The disclosed structure provides means for mounting the reel tightly in place and provides adjustment means for clamping the reel in place and compensating for reels of various manufacturers.

U.S. Pat. Nos. 3,727,338; 3,618,253; 3,447,254; 3,279,116; 2,735,208; 2,729,012 and 2,334,646 disclose eyeless casting rods employing various reel mounting attachments, some of which attempt to align the point of line movement from the reel with the bore of the casting rod.

U.S. Pat. No. 2,777,239 discloses a hollow fishing rod through which the line is guided which employs line guiding rings in the hollow interior of the rod. These rings add an undesirable weight to the rod.

U.S. Pat. No. 1,595,275 discloses a hollow fishing rod through which the line is guided employing a metallic line guiding tube extending within and lining the bore of the rod which increase through friction the drag on the line.

SUMMARY OF THE INVENTION

In accordance with the invention claimed, a new and improved eyeless fishing rod is provided employing a novel handle arrangement which conveniently stores a means for threading a fishing line through the bore of the rod and further cooperates to easily attach and detach a reel from the rod while positioning the hand of the user on the rod in a position for easily operating the reel and optimumly feeding the line through a hollow rod.

It is, therefore, one object of this invention to provide a new and improved eyeless fishing rod employing novel hand and reel gripping features.

Another object of this invention is to provide a new and improved eyeless fishing rod which provides for straight line passage of the fishing line through the center of the rod while reducing drag on the line.

A further object of this invention is to provide a new and improved eyeless fishing rod employing a novel bore lining to reduce line drag.

A still further object of this invention is to provide a novel handle for gripping the rod in an optimum position for operating an associated reel and employing a novel means for storing a line threading means.

A still further object of this invention is to provide a handle comprising hingedly mounted parts which when opened exposes the line threading means in an easily accessible position.

Further objects and advantages will be apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a partial cross-section view partly in elevation of the fishing rod and associated reel and embodying the invention;

FIG. 2 is a cross-sectional view of the handle shown in FIG. 1 in its hingedly open position;

FIG. 3 is a partial exploded view showing the reel mounting means;

FIG. 4 is an exploded view of the cooperating parts of the tip of the rod illustrating the line guiding means;

FIG. 5 is an elevational view partially in section showing the magnetic needle attached to the fishing line being threaded through the bore of the rod;

FIG. 6 is a cross-sectional view of FIG. 1 taken along the line 6—6;

FIG. 7 is a cross-sectional view of FIG. 1 taken along the line 7—7;

FIG. 8 is a cross-sectional view of FIG. 1 taken along the line 8—8; and

FIG. 9 is a perspective view of the latch for holding the cooperating parts of the handle together.

DESCRIPTION OF THE PREFERRED EMBODIMENT

Referring more particularly to the drawing by characters of reference, FIGS. 1-9 disclose an eyeless fishing rod 10 comprising an elongated rod portion 11 which may comprise one or more parts which form a generally cylindrical elongated tapered tube having an internal passageway 12. The rod portion may be formed of fiberglass or other suitable material.

As shown in FIG. 1 the end 13 of the rod portion 11 is provided with a cylindrical tip member 11A which slidingly fits over the end 13 of rod portion 11 and is distorted outwardly at its free end to form a cavity 14 into which is securely fitted, such as by bonding, a bushing 15 formed of suitable material such as ceramic which covers not only the end of rod portion 11 and any exposed edges of the flared end portion of member 11A forming cavity 14 to prevent snagged lines, but reduces to a minimum the drag of the fishing line passing over the surface of bushing 15.

The fishing rod is provided with a holder portion 16 on which a conventional reel 17 may be mounted and secured firmly in position. A handle 18 on the holder portion 16 comprises a hollow member formed by two hingedly mounted relatively movable parts 19 and 20 housing in a readily accessible position a pivotally mounted needle container 25. This storage container provides a storage chamber for a magnetic attractable needle 21 and a permanent magnet 57. The needle and magnet are used for threading the line 22 mounted on the reel 17 through the hollow internal passageway 12 of rod portion 11 of fishing rod 10.

The holder portion 16 may be a single or molded piece formed of ABS plastic which is copolymer, i.e., a mixture of acrylic, butadrene and styrene having a high luster, a hard surface, good impact strength and resistance to staining. This material holds its given color well and is easily used in the injection molding processes.

As noted from FIG. 1 of the drawing, the holder portion 16 of the fishing rod 10 is integral with and forms part 19 of handle 18. This part comprises a cylindrical like arcuate configuration which forms the top half of the handle while part 20 of the handle comprises the bottom enclosing portion of the substantially cylindrical like configuration which is pivotally mounted on a pin or rivet assembly 23 to fixedly attach to part 19 of the handle for moving relative thereto. The outer contour of part 20 is tapered in width from the free end of the handle toward its end adjacent the reel for a more efficient grip by the user following the natural conformation of the user's hand with the thumb of the user adjacent the reel for optimum control thereof.

The rivet assembly also pivotally attaches an arm 24 to which is fixedly secured the hollow plastic tube 25, the open free end of which is arranged for receiving therein the magnetic attractable needle 21 secured by the cone shaped magnet 57. Arm 24 is further provided with a flange 26 contoured to securely support around its arcuate periphery the bight 27 of a U-shaped hairpin like spring 28. The end of one of the legs 29 of spring 28 is slidable attached to a flange 30 on the inside periphery of part 19 of handle 18 and the other leg 31 of spring 28 is slidably attached to a flange 32 on the inside periphery of part 20 of handle 18.

To hold the parts 19 and 20 together in a handle configuration, a clasp 34 is pivotally mounted in an aperture orindentation 35 formed in the outer periphery of part 19 of the handle at its free end thereof. This clasp comprises a right angular member 36 pivotally mounted at its corner 37 on a pin 38 attached to the peripheral sides of indentation 35. The end of leg 39 of member 36 is bifurcated to provide a resilient portion 40 which is only slightly biased when the parts 19 and 20 of handle 18 are together, as shown in FIG. 1, and must be tensed, as shown in FIG. 2, to release the parts 19 and 20 to cause them to be pivotally moved away from each other by spring 28, as shown in FIG. 2. To hold parts 19 and 20 together, the other leg 41 of member 36 is provided with a catch 42 for engaging with a ledge 43 on part 20 to form a firm latching engagement of parts 19 and 20 of handle 18.

FIGS. 1 and 2 further illustrate that the end 44 of part 20 of handle 18 protrudes through an opening 45 in part 19 of the handle forming a ledge 46 through which is threadedly mounted a bolt 47. Bolt 47 is used to hold one end of the mounting plate 48 of reel 17 in place on the holder portion 16 of the fishing rod. The other end of plate 48 of reel 17 is held in place under a ledge 49 of a clamp element 50 threadedly attached to holder portion 16 of the fishing rod. Bolt 47 provides a one time initial adjustment to accommodate the particular reel used. In order to hold plate 48 of reel 17 firmly in place an arched spring 48A, as shown in FIGS. 1 and 3, is bolted at one end to holder portion 16 and clamp element 50. When one end of plate 48 of reel 17 is inserted under ledge 49 of clamp element 50 and bolt 47 in ledge 49 of part 20 is tightened down spring 48A is flattened to lie parallel with the juxtapositioned surface of holder portion 16. The pressure of the now flattened spring 48A provides a force against ledge 49 and bolt 47 to hold the reel tightly in place.

It should be noted that the opening of handle 18, i.e. the movement of part 20 relative to part 19 thereof, accomplishes two functions. One function is to move the open end of tube 25 containing magnetic needle 21 and magnet 57 to substantially the center of the opening formed between the two spaced apart portions 19 and 20 of the handle 18 for ease in gripping magnet 57 attached to needle 21 and to also release any reel mounted on holder portion 16 of the fishing rod.

As shown in FIGS. 1 and 6, the rod portion 11 of the fishing rod 10 is provided at its large end 51 with a tapered ferrule 52 firmly secured thereto by a bonding agent, such as a synthetic rubber adhesive known as PLIOBOND. This ferrule is formed of a high strength acetal resin. one commercial product of this type is known as DELRIN which has a high lubricity and rigidity with excellent memory characteristics. This ferrule may be easily injection molded with this material. The ferrule 52 is then fitted into a ferrule block 53 of the same DELRIN material which is in turn bolted to holder portion 16 of the rod by bolts 54. A line keeper 55 of the DELRIN material is secured by bolts 54 to the holder portion 16 for use by the sports person in the usual manner. Block 53 may be formed as an integral part of the tapered ferrule 52 if so desired.

The inside of hollow interior of rod portion 11 may be coated with a suitable lining material 58 such as TFE, i.e., Teflon applied by spraying or by using a Teflon film applied during the fabrication of the fiberglass rod 11, to reduce drag on the line.

Thus, a fishing rod is disclosed which may, for example, comprise a spin casting rod for use in sport fishing consisting of a tubular rod through which the fishing line passes thereby eliminating external line guides. The elimination of the external line guides eliminates line fouling, reduces manufacturing costs and enhances rod action. The tapered tubular rod consists of fiberglass or graphite filaments bonded together by a resin and internally coated with a low friction material. The tubular rod is provided with a single guide bushing 15 at the tip end.

The butt end hollow section of the rod portion 11 is proportionately larger, the open tip end containing the guide bushing 15 to minimize contact of the line with the bore of the rod portion 11 during a cast.

The rod portion is attached by the tapered ferrule 52 of a high strength plastic material.

The grip portion of the fishing rod or handle 18 is tapered increasingly in cross-section from the rear or free end of the handle to its forward or reel gripping portion to provide a more efficient grip following the natural configuration of the user'hand. The thumb is in the optimum position for control of the line hold-release mechanism of the spin casting reel.

For threading a line from reel 17 through the hollow interior of the rod portion 11, the line 22 is attached to the eye of the needle 21 and the needle is fed into the open end 56 of the rod portion 11. it is then moved through the rod portion 11 under the influence of a magnet 57 moved along the outer periphery of the rod portion until the needle and the line attached thereto emerges from the tip of the fishing rod in the manner illustrated in FIG. 5. It should be noted that the magnet 57 may be coated with a non-marring soft plastic material.

Although but a few embodiments of the invention have been shown and described, it will be apparent to those skilled in the art that various changes and modifications may be made therein without departing from the spirit of the invention or from the scope of the appended claims.

What is claimed is:

1. A fishing rod comprising:
   an elongated rod portion,
   a holder portion,
   a hollow elongated handle means comprising two hingedly mounted parts, and
   means for securing one end of said rod portion to said holder portion,
   said holder portion comprising clamping means along a portion thereof for securing at one end thereof a reel to said fishing rod and forming at the other free end thereof a first part of said handle means,
   the second part of said handle means being hingedly connected to said first part and biased to move relative thereto when released from said first part,
   said second part cooperating with said holder portion to adjustably hold a reel in position on said holder portion in said clamping means when it is latched to said first part.

2. The fishing rod set forth in claim 1 wherein:
   said rod portion comprises a hollow tubular configuration.

3. The fishing rod set forth in claim 2 wherein:
   said rod portion is provided with a tapered bore, the larger end of which is at said one end of the rod portion.

4. The fishing rod set forth in claim 3 wherein:
   the bore of said rod portion is provided with a coating of a low frictional material.

5. The fishing rod set forth in claim 3 wherein:
   the bore of said rod portion is provided with a liner for reducing line drag.

6. The fishing rod set forth in claim 2 in further combination with:
   needle holding means mounted between said first and second parts of said handle means and being encased within said handle means when said first and second parts are latched together,
   whereby a needle attachable to a line fed from an associated reel is movable through the rod portion under the influence of a magnet moved along the other periphery of said rod portion.

7. The fishing rod set forth in claim 2 in further combination with:
   a hollow sleeve mounted over the other end of said rod portion,
   the free end of said sleeve being flared outwardly thereof beyond the end of the rod portion to form a cavity for receiving a bushing, and
   a bushing mounted in said cavity for covering the other end of said rod portion and the interior flared edge of said sleeve for preventing line snagging.

8. The fishing rod set forth in claim 7 wherein:
   said bushing comprises a funnel shaped configuration flaring outwardly of the other end of said rod portion.

9. The fishing rod set forth in claim 8 wherein:
   said bushing is formed of a ceramic material.

10. The fishing rod set forth in claim 1 wherein:
    said handle increases in cross-section from the free end thereof.

11. The fishing rod set forth in claim 6 in further combination with:
    spring means mounted within said handle means for biasing the two parts thereof outwardly thereof.

12. The fishing rod set forth in claim 11 wherein:
    said spring means comprises a U-shaped hairpin configuration, the bight of which is attached to hingedly attached parts of said handle means and each of the legs of said U-shaped hairpin configuration is attached to a different one of said parts of said handle means.

13. The fishing rod set forth in claim 1 in further combination with:
    clasp means mounted on the outer periphery of the free end of said handle means,
    said clasp means comprising a spring biased member mounted on the free end of said first part of said handle means for engaging with a catch mounted on said second part of said handle means.

14. The fishing rod set forth in claim 1 in further combination with:
    a spring mounted on said holder portion for engaging the reel and biasing it against said clamping means to hold the reel tightly in place on the fishing rod.

15. The fishing rod set forth in claim 14 wherein:
    said spring comprises an arched leaf spring secured at one end and free to slide along said holder portion at the other end when flattened by the reel when the reel is clamped to the fishing rod by said clamping means and the free end of said first part of said handle means.

* * * * *